US006706828B2

(12) United States Patent
DiMaio

(10) Patent No.: US 6,706,828 B2
(45) Date of Patent: Mar. 16, 2004

(54) PROCESS FOR THE OLIGOMERIZATION OF α-OLEFINS HAVING LOW UNSATURATION

(75) Inventor: Anthony-Joseph DiMaio, Woodbury, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/163,132

(22) Filed: Jun. 4, 2002

(65) Prior Publication Data

US 2003/0232937 A1 Dec. 18, 2003

(51) Int. Cl.[7] ................................. C08F 4/42
(52) U.S. Cl. ................. 526/160; 526/348; 526/943; 526/348.2; 526/170; 526/127; 502/152
(58) Field of Search .................. 526/348, 160, 526/943, 348.2, 170, 127; 502/152

(56) References Cited

U.S. PATENT DOCUMENTS

| | | | |
|---|---|---|---|
| 5,145,819 A | 9/1992 | Winter et al. ............... | 502/117 |
| 5,229,478 A | 7/1993 | Floyd et al. ............... | 526/160 |
| 5,455,365 A | 10/1995 | Winter et al. .............. | 556/7 |
| 5,504,232 A | 4/1996 | Winter et al. .............. | 556/7 |
| 5,585,448 A | * 12/1996 | Resconi et al. ............ | 526/170 |
| 5,672,668 A | * 9/1997 | Winter et al. .............. | 526/127 |
| 5,688,887 A | 11/1997 | Bagheri et al. ............ | 526/348.7 |
| 5,763,542 A | 6/1998 | Winter et al. .............. | 526/127 |
| 5,929,185 A | 7/1999 | Rosch et al. ............... | 526/336 |
| 6,043,401 A | 3/2000 | Bagheri et al. ............ | 585/12 |
| 2002/0010290 A1 | 1/2002 | Minami et al. ............ | 526/127 |

FOREIGN PATENT DOCUMENTS

| | | |
|---|---|---|
| EP | 0613873 A2 | 9/1994 |
| WO | 96/23751 | 8/1996 |
| WO | 98/52888 | 11/1998 |
| WO | 00/08066 | 2/2000 |
| WO | 00/08077 | 2/2000 |

OTHER PUBLICATIONS

Ewen J., J. Am. Chem. Soc., 106:6355–6364 (1984).
Herrmann W. et al., Angew. Chem. Int. Ed. Engl., 28:1511–1512 (1989).
Spaleck W. et al., New J. Chem., 14:499–503 (1990).
Collins S. et al., Organometallics, 10:2061–2068 (1991).
Pena A. et al., Macromol. Rapid Commun; 12:353–358 (1991).
Spaleck W. et al., Angew. Chem. Int. Ed. Engl., 31:1347–1350 (1992).
Spaleck W. et al., Macromal. Symp., 89:237–247 (1995).
Uozumi–T. et al., Macromol. Rapid Commun., 18:883–889 (1997).
Naga N. et al., Macromol. Chem. Phys. 200:1587–1594 (1999).

(List continued on next page.)

Primary Examiner—Ling-Siu Choi
(74) Attorney, Agent, or Firm—Michael P. Dilworth

(57) ABSTRACT

A process is disclosed for the preparation of a poly(α-olefin) polymer wherein the process comprises polymerizing at least one α-olefin in the presence of hydrogen and a catalytically effective amount of catalyst comprising the product obtained by combining a metallocene catalyst with a cocatalyst, the metallocene catalyst being at least one meso compound of general formula:

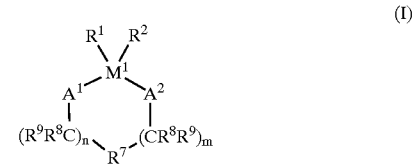

(I)

wherein:

$A^1$ and $A^2$ are independently selected from the group consisting of mononuclear and polynuclear hydrocarbons;

$M^1$ is a metal from group IVb, Vb, or VIb of the Periodic Table;

$R^1$ and $R^2$ are independently selected from the group consisting of hydrogen, $C_1$–$C_{10}$ alkyl, $C_1$–$C_{10}$-alkoxy, $C_6$–$C_{10}$ aryl, $C_6$–$C_{10}$ aryloxy, $C_2$–$C_{10}$ alkenyl, $C_7$–$C_{40}$ arylalkyl, $C_7$–$C_{40}$ alkylaryl, $C_8$–$C_{40}$ arylalkenyl and halogen;

$R^7$ is selected from the group consisting of:

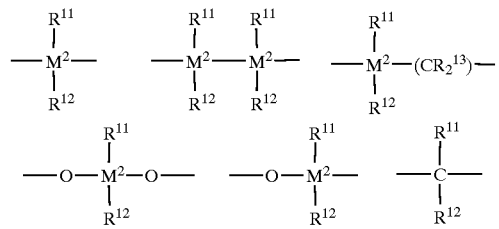

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ and $=P(O)R^{11}$, where $R^{11}$, $R^{12}$, and $R^{13}$ are independently selected from the group consisting of hydrogen, halogen, $C_1$–$C_{10}$ alkyl, $C_1$–$C_{10}$ fluoroalkyl, $C_6$–$C_{10}$ aryl, $C_6$–$C_{10}$ fluoroaryl, $C_1$–$C_{10}$ alkoxy, $C_2$–$C_{10}$ alkenyl, $C_7$–$C_{40}$ arylalkyl, $C_8$–$C_{40}$ arylalkenyl, and $C_7$–$C_{40}$ alkylaryl, or $R^{11}$ and $R^{12}$ or $R^{11}$ and $R^{13}$, in each case with the atoms connecting them, form a ring; and $M^2$ is selected from the group consisting of silicon, germanium, and tin;

$R^8$ and $R^9$ are independently selected from the group consisting of hydrogen, halogen, $C_1$–$C_{10}$ alkyl, $C_1$–$C_{10}$ fluoroalkyl, $C_6$–$C_{10}$ aryl, $C_6$–$C_{10}$ fluoroaryl, $C_1$–$C_{10}$ alkoxy, $C_2$–$C_{10}$ alkenyl, $C_7$–$C_{40}$ arylalkyl, $C_8$–$C_{40}$ arylalkenyl, and $C_7$–$C_{40}$ alkylaryl;

m and n are identical or different and are zero, 1, or 2, with m plus n being zero, 1 or 2.

7 Claims, No Drawings

OTHER PUBLICATIONS

Resconi L., in Metallocene–catalyzed Polymers, Preparation Properties and Technology, Kaminsky W. Scheirs J. Eds., Wiley, vol. 1 pp. 467–484 (1999).

Schaverien C. et al., Organometallics, 20:3436–3452 (2001).

Brull R. et al., Macromol. Symp., 165:11–18 (2001).

Grumel V. et al., Macromol. Mater. Eng., 286:480–487 (2001).

Unsaturation in Isoprene–Isobutylene Copolymers, Industrial and Engineering Chemistry, 40:1277–1280 (1948).

* cited by examiner

PROCESS FOR THE OLIGOMERIZATION OF α-OLEFINS HAVING LOW UNSATURATION

BACKGROUND OF THE INVENTION

1. Field of the Invention

This invention relates to a process for producing polymers of α-olefins, e.g., 1-hexene, 1-octene, 1-decene, 1-dodecene, and the like, in the presence of a metallocene catalyst, to form low molecular weight oligomers and polymers having viscosity and other physical properties suitable for synthetic lubricant applications.

2. Description of Related Art

Catalytic oligomerization of olefins is a known technique for manufacturing basestocks useful as lubricants. Efforts to improve upon the performance of natural mineral oil based lubricants by the synthesis of oligomeric hydrocarbon fluids have been the subject of important research and development in the petroleum industry for several decades, leading to recent commercial production of a number of superior poly(α-olefin) synthetic lubricants (hereinafter referred to as "PAO"). These materials are primarily based on the oligomerization of α-olefins, such as $C_2$–$C_{20}$ olefins. Industrial research effort on synthetic lubricants has generally focused on fluids exhibiting useful viscosities over a wide range of temperature, i.e., improved viscosity index (VI), while also showing lubricity, thermal, and oxidative stability and pour point equal to or better than mineral oil. These newer synthetic lubricants provide lower friction and hence increase mechanical efficiency across the full spectrum of mechanical loads and do so over a wider range of operating conditions than mineral oil lubricants.

Well known structural and physical property relationships for high polymers as contained in the various disciplines of polymer chemistry have pointed the way to α-olefins as a fruitful field of investigation for the synthesis of oligomers with the structure thought to be needed to confer improved lubricant properties thereon. Owing largely to studies on the polymerization of propene and vinyl monomers, the mechanism of the polymerization of α-olefins and the effect of that mechanism on polymer structure is reasonably well understood, providing a strong resource for targeting on potentially useful oligomerization methods and oligomer structures.

A significant problem in the manufacture of synthetic lubricants is the production of lubricants in a preferred viscosity range in good yield without excessive catalyst deactivation. Frequently, it is difficult to directly produce lower viscosity range lubes without incurring lower yields due to the production of non-lubricant range materials. Methods to control molecular weight of lubricants in the oligomerization step are sought after in the art to overcome the problems in the manufacture of, particularly, lower viscosity lubricants.

U.S. Pat. No. 4,769,510 discloses that in the polymerization of propylene and higher 1-olefins, polymers that have a high degree of isotacticity and a narrow distribution of molecular weight are obtained in the presence of a catalyst system composed of a zirconium compound that is stereo-rigid and chiral and a linear or cyclic aluminoxane. The catalyst system is said to be exceptionally active.

U.S. Pat. No. 5,145,819 discloses certain 2-substituted bisindenylmetallocenes that are said to form, together with aluminoxanes as cocatalysts, a very effective catalyst system for the preparation of polyolefins of high molecular weight.

U.S. Pat. No. 5,455,365 discloses a process for the preparation of an olefin polymer using metallocenes containing specifically substituted indenyl ligands. It is said that a highly effective catalyst system for the polymerization of olefins comprises a cocatalyst, preferably an aluminoxane, and a metallocene of a given structural formula.

U.S. Pat. Nos. 5,504,232 and 5,763,542 disclose a catalyst system for the polymerization of olefins that comprises a cocatalyst, preferably an aluminoxane, and a metallocene that contains specifically substituted indenyl ligands.

U.S. Pat. No. 5,672,668 discloses a process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms connecting them, can form a ring, at a temperature of from −60° to 200° C., at a pressure of from 0.5 to 100 bar, in solution, in suspension or in the gas phase, in the presence of a catalyst formed from a metallocene of a given structural formula in the meso-form or a meso:rac mixture, with meso:rac>1:99, as transition-metal compound and a cocatalyst.

U.S. Pat. No. 5,688,887 discloses catalysts and processes to make low molecular weight, essentially terminally-unsaturated, viscous poly(1-olefin) or copoly(1-olefin) having a high terminal vinylidine content from a feed stock containing one or more 1-olefin and other volatile hydrocarbon liquids using a Ziegler catalyst made from a Group IVb metallocene and an aluminoxane cocatalyst, particularly bis(cyclopentadienyl) and bis(indenyl) titanium(IV), zirconium(IV) or hafnium(IV) compounds and methylaluminoxane. A particularly useful feedstock is said to be a refinery stream containing 1-olefins and isobutylene, which is used to make polyisobutylene. The reactive, essentially terminally-unsaturated, viscous poly(1-olefin) or copoly(1-olefin) can be functionalized to make a number of products useful as sealants, petroleum additives, adhesives, and the like by reacting the terminal vinylidine linkage with an aromatic, an epoxidation agent, a silylation agent, maleic anhydride, carbon monoxide and hydrogen, hydrogen, a halogen, a hydrohalogen, and the like.

U.S. Pat. No. 5,929,185 discloses copolymers that have a viscosity index VI of more than 160 and comprise A) from 99.0 to 99.99% by weight of $C_2$–$C_{20}$-alk-1-enes and B) from 0.01 to 1.0% by weight of $C_5$–$C_{20}$-α, ω-dienes having isolated double bonds.

U.S. Pat. No. 6,043,401 discloses catalysts and processes to make low molecular weight, essentially terminally-unsaturated, viscous poly(1-olefin) or copoly(1-olefin) having a high terminal vinylidine content from a feed stock containing one or more 1-olefin and other volatile hydrocarbon liquids using a Ziegler catalyst made from a Group IVb metallocene and an aluminoxane cocatalyst, particularly bis(cyclopentadienyl) and bis(indenyl) titanium(IV), zirconium(IV) or hafnium(IV) compounds and methylaluminoxane. A particularly useful feedstock is said to be a refinery stream containing 1-olefins and isobutylene, which is used to make polyisobutylene. The reactive, essentially terminally-unsaturated, viscous poly(1-olefin) or copoly(1-olefin) can be functionalized to make a number of products said to be useful as sealants, petroleum additives, adhesives, and the like by reacting the terminal vinylidine linkage with an aromatic, an epoxidation agent, a silylation agent, maleic anhydride, carbon monoxide and hydrogen, hydrogen, a halogen, a hydrohalogen, and the like.

U.S. Published Appl. No. 20020010290 discloses a process for producing a polymer of an α-olefin which comprises polymerizing an α-olefin having at least 4 carbon atoms in the presence of a catalyst for producing polymers of olefins which comprises (A) a specific metal compound and (B) at least one compound selected from (b-1) an organoaluminum oxy compound and (b-2) an ionic compound. The polymer of an α-olefin is said to be useful as a component of lubricant.

U.S. patent appl. Ser. No. 09/637,791, filed Aug. 11, 2000, describes a process for polymerizing 1-olefins to PAO with substantial saturation suitable for lubricant applications without need for further hydrogenation via the use of hydrogen with bridged cyclopentadienyl-fluorenyl metallocenes.

U.S. patent appl. Ser. No. 10/014,911, filed Dec. 14, 2001, describes a process for copolymerizing 1-olefins and 2-norbornene to PAO with substantial saturation suitable for lubricant applications without need for further hydrogenation via the use of hydrogen with bridged cyclopentadienyl-fluorenyl metallocenes.

EP 0 613 873 A2 discloses a process for the preparation of liquid organic compounds, suitable as base materials for lubricants, comprising contacting one or more alpha-olefins containing 8 to 20 carbon atoms per molecule, under oligomerization conditions with a catalyst composition based on a) a Group IV metal compound of the general formula $(Cp)_2MeX_2$, wherein Cp represents a cyclopentadienyl group, Me represents a Group IV A metal and each X independently represents a moiety selected from the group consisting of hydrocarbyl groups, hydrocarboxy groups, hydrocarbamido groups, each of which may be optionally substituted, hydrogen atoms and halogen atoms and b) a substantially non-coordinating anion source; and optionally subjecting the oligomers formed to an addition reaction to reduce their olefinic unsaturation.

WO 96/23751 discloses a process for preparing olefin oligomers with a molecular weight distribution $M_w/M_n$ in a range from 1.0 to 2.4 by oligomerization of olefins in the presence of metallocene catalyst systems. The turbidity index of the catalyst-containing reaction mixture lies in a range from 1 to 10. The olefin oligomers are said to be useful as starting materials for preparing lubricants, fuel and oil additives, and as macromonomers.

WO 98/52888 discloses a process for the production of oligomers from an olefinic hydrocarbon feedstock. The process comprises oligomerizing olefins in the feedstock by means of a metallocene, catalyzed oligomerization reaction. The feedstock used is a Fisher-Tropsch-derived olefinic hydrocarbon feedstock comprising at most 65%, and typically 20–65%, by mass of α-olefins. In particular, the feedstock may comprise 30–50% by mass α-olefins, at most 30% by mass paraffins, at most 5% by mass oxygenated hydrocarbons and at most 5% by mass aromatic hydrocarbons.

WO 00/08066 discloses a catalyst system said to be suitable for preparing substantially terminally unsaturated atactic polymers or copolymers of α-olefins having a number average molecular weight in the range 300–500,000 that comprises (A) a metallocene complex and (B) a cocatalyst comprising (i) a Group III Metal alkyl compound and (ii) a triaryl boron compound. Preferred metallocenes are those having alkyl ligands on the metal atom. The preferred Group III metal alkyl compound is triisobutyl aluminum and the preferred triaryl boron compound is tris(pentafluorophenyl) boron.

WO 00/08070 discloses a catalyst system said to be suitable for preparing substantially terminally unsaturated atactic polymers or copolymers of α-olefins having a number average molecular weight in the range 300–500,000 comprises: A) a metallocene complex; and B) a cocatalyst comprising: i) an aluminoxane; and ii) a Group III metal alkyl compound having at least 2 carbon atoms. The use of the Group III metal compound allows for a reduction in the aluminoxane content in the cocatalyst. Preferred metallocenes are those having alkyl substitution on the cyclopentadienyl rings and the preferred Group III metal alkyl compound is triisobutyl aluminum.

Ewen, J., *J. Am. Chem. Soc.*, 106:6355–6364 (1984), provides the first report of the use of a bridged, bis-indenyl metallocene for olefin polymerization, using $Et(Ind)_2TCl_2$. Propene polymerization of a rac/meso mixture of catalyst produces polypropylene identified with both isotactic and atactic polymer in proportion to the rac/meso ratio. It is demonstrated that the meso form of the catalyst makes an atactic polymer.

Herrmann, W., et al., *Angew. Chem. Int. Ed. Engl.*, 28:1511–1512 (1989), provide the first open literature report of a silyl-bridged, bis-indenyl zirconocene. The authors report the separation and removal of the meso isomer is necessary because it otherwise leads to an "undesirable" atactic polymer. The metallocene reported is unsubstituted, i.e., $Me_2Si(Ind)_2ZrCl_2$.

Spaleck, W., et al., *New J. Chem.*, 14:499–503 (1990), report a study of 14 different bridged metallocenes in propylene polymerization, mostly based on variations of the silyl-bridged, bis-indenyl zirconocene system. This paper is notable owing to the number of structural variations possible, but all studies are with rac isomers. Footnote 10 states that the meso-isomers were separated off.

Collins, S., et al., *Organometallics*, 10:2061–2068 (1991), report a study of rac and meso $Et(Ind)_2ZrCl_2$ and meso $Et(IndH_4)_2ZrCl_2$ for polypropylene tacticity. The paper states that the polymerization activity is lower in the meso isomers, and produces atactic polypropylene.

Peña, A, et al., *Macromol. Rapid Commun.*, 12:353–358 (1991), report a study of 1-decene polymerization using traditional $MgCl_2$-supported Ziegler-Natta catalyst systems, looking at the effects of Lewis base modification on degree of isotacticity. The paper is useful to confirm $^{13}$C-NMR assignments, DSC melt behavior, and to show that a number of systems, non-metallocene included, are capable of 1-decene polymerization.

Spaleck, W., et al., *Angew. Chem. Int. Ed. Engl.*, 31:1347–1350, (1992), report the synthesis of and propene polymerization of by several substituted, silyl-bridged, bis-indenyl zirconocenes, including those bridged in the 2-indenyl and 2 and 4 positions. Substituted tetrahydroindenyl compounds are also reported. The rac isomer was used in all cases of polymerization reported.

Spaleck, W., et al., *Macromol. Symp.*, 89:237–247 (1995), discuss structure-performance relationships in propene polymerization behavior with several modified silicon-bridged, bis-indenyl zirconocenes. Examples are provided of propene polymerizations with meso-isomers for the unsubstituted and 3-substituted silicon-bridged, bis-indenyl zirconocenes. All produce amorphous polymers, but molecular weight is increased with increasing substitution "bulk".

Uozumi, T., et al., *Macromol. Rapid Commun.*, 18:883–889 (1997), studied the copolymerization of ethylene and 1-octene with a meso-$Me_2Si(2-MeInd)_2ZrCl_2$ catalyst system. Homopolymerizations of 1-octene were presented as part of the study, yielding a low molecular weight polymer that was identified as amorphous. Compared to the same results with rac-Me$_2$Si(2-MeInd)$_2$ZrCl$_2$, the meso isomer was much less active in 1-octene homopolymerization.

Naga, N., et al., *Macromol. Chem. Phys.*, 200:1587–1594 (1999), described the polymerization behavior of rac and meso isomers of —Me$_2$Si(2-MeInd)$_2$ZrCl$_2$ with 1-propene, 1-butene, and 1-hexene to produce isotactic and atactic homopolymers, respectively. The relative rates of polymerization between the two isomers are compared. It was concluded that for 1-hexene, coordination to the catalyst site is much more difficult for the meso-isomer than in propene or butene, resulting in a higher R$_p$(rac)/R$_p$(meso).

Resconi, L., in *Metallocene-catalyzed polymers. Preparation Properties, and Technology*; Kaminsky, W.; Scheirs, J., Eds.; Wiley, Vol. 1, pp. 467–484 (1999), provides a review of the synthesis and properties of atactic polypropylene made using meso isomers and structurally aspecific metallocenes. The article states that, in general, the influence of hydrogen is to increase activity; however, in the work presented for atactic polypropylene, hydrogen either has no effect or an adverse effect on activity. Also, hydrogen does not effect chain termination/chain transfer.

Schaverien, C., et al., *Organometallics*, 20:3436–3452 (2001), report the synthesis and polymerization activity of ethylene-bridged bis(2-indenyl) zirconocenes, both in the rac and meso forms. The paper demonstrates that the bridge does not necessarily have to be in the 1-position. Substituted indenyls are also made and used, i.e., 1-methyl-2-indenyl and 1-methyl-4-phenyl-2-indenyl rings bridged by ethylene. Polymers were made from ethylene, propylene, hexane, and copolymers of the three. The influence of hydrogen was also discussed.

Brüll, R, et al., *Macromol. Symp.*, 165:11–18 (2001), report the polymerization of 1-pentene with a variety of bridged and unbridged metallocenes, forming oligomers and polymers ranging from dimers of pentene to molecular weights of 149,000. The paper demonstrates that the degree of polymerization is highly dependent on the metallocene catalyst. Also, a range of 1-olefins was studied from 1-pentene to 1-octadecene to demonstrate that the molar mass of the polyolefin decreases with increasing temperature. Molar mass is independent of chain length.

Grumel, V., et al., *Macromol. Mater. Eng.*, 286:480–487 (2001), polymerized 1-olefins from pentene to octadecene with Cp$_2$HfCl$_2$, Me$_2$C(Cp-9-Flu)ZrCl$_2$, and rac-Et(Ind)$_2$ZrCl$_2$. The paper concludes that the molecular weight of the polymer is highly dependent on the catalyst, but is independent of monomer chain length. Also, there is a decrease in stereoregularity of the poly(1-olefin) with increasing monomer chain length for the stereospecific metallocenes used.

The disclosures of the foregoing are incorporated herein by reference in their entirety.

SUMMARY OF THE INVENTION

The present invention is directed to a process for polymerizing α-olefins, such as (but not limited to) 1-hexene, 1-octene, 1-decene, and 1-dodecene, to form low molecular weight oligomers and polymers having viscosities and other physical properties suitable for synthetic lubricant applications wherein the process does not require the use of a secondary hydrogenation step to achieve a saturated polymer.

More particularly, the present invention is directed to a process for the preparation of a poly(α-olefin) polymer comprising polymerizing at least one α-olefin in the presence of hydrogen and a catalytically effective amount of catalyst comprising the product obtained by combining a metallocene catalyst with a cocatalyst, the metallocene catalyst being at least one meso compound of general formula:

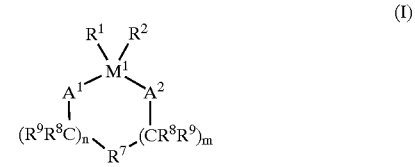

(I)

wherein:

A$^1$ and A$^2$ are independently selected from the group consisting of mononuclear and polynuclear hydrocarbons;

M$^1$ is a metal from group IVb, Vb, or VIb of the Periodic Table;

R$^1$ and R$^2$ are independently selected from the group consisting of hydrogen, C$_1$–C$_{10}$ alkyl, C$_1$–C$_{10}$ alkoxy, C$_6$–C$_{10}$ aryl, C$_6$–C$_{10}$ aryloxy, C$_2$–C$_{10}$ alkenyl, C$_7$–C$_{40}$ arylalkyl, C$_7$–C$_{40}$ alkylaryl, C$_8$–C$_{40}$ arylalkenyl, and halogen;

R$^7$ is selected from the group consisting of

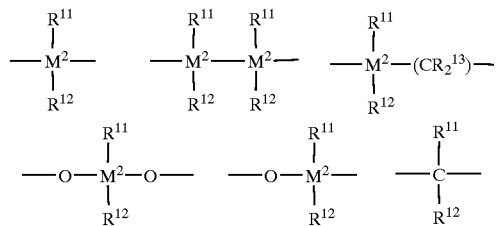

=BR$^{11}$, =AlR$^{11}$, —Ge—, —Sn—, —O—, —S—, =SO, =SO$_2$, =NR$^{11}$, =CO, =PR$^{11}$ and =P(O)R$^{11}$, where R$^{11}$, R$^{12}$, and R$^{13}$ are independently selected from the group consisting of hydrogen, halogen, C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl, or R$^{11}$ and R$^{12}$ or R$^{11}$ and R$^{13}$, in each case with the atoms connecting them, form a ring;

M$^2$ is selected from the group consisting of silicon, germanium, and tin;

R$^8$ and R$^9$ are independently selected from the group consisting of hydrogen, halogen, C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl;

m and n are identical or different and are zero, 1, or 2, with m plus n being zero, 1 or 2.

In another aspect, the present invention is directed to a poly(α-olefin) obtained from the polymerization of at least one α-olefin having from 2 to about 20 carbon atoms and prepared by a process comprising polymerizing the monomer in the presence of hydrogen and a catalytically effective amount of a catalyst comprising the product obtained by combining a metallocene catalyst with a cocatalyst, the metallocene catalyst being at least one meso compound of Formula I.

In still another aspect, the present invention is directed to a lubricant composition comprising a lubricant and a viscosity-modifying amount of a poly(α-olefin) obtained from the polymerization of at least one α-olefin having from 2 to about 20 carbon atoms and prepared by a process comprising polymerizing the monomer in the presence of hydrogen and a catalytically effective amount of a catalyst comprising the product obtained by combining a metallocene catalyst with a cocatalyst, the metallocene catalyst being at least one meso compound of Formula I.

In yet another aspect, the present invention is directed to a method for improving the viscosity index of a lubricant composition comprising adding to the composition a viscosity-modifying amount of a poly(α-olefin) polymer obtained from the polymerization of at least one α-olefin having from 2 to about 20 carbon atoms and prepared by a process comprising polymerizing the monomer in the presence of hydrogen and a catalytically effective amount of a catalyst comprising the product obtained by combining a metallocene catalyst with a cocatalyst, the metallocene catalyst being at least one meso compound of Formula I.

Such metallocene catalysts and cocatalysts, and methods for preparing them, have been described, for example, in U.S. Pat. Nos. 4,769,510 and 5,145,819, the disclosures of which are incorporated herein by reference in their entirety. In both these references, however, emphasis is strongly directed to racemic metallocenes, although U.S. Pat. No. 5,145,819 mentions that if the meso and racemic forms are not separated after synthesis, atactic polymer is formed alongside isotactic polymers, and that, for certain applications—soft moldings, for example—this may be entirely desirable.

DESCRIPTION OF THE PREFERRED EMBODIMENTS

As described above, the meso metallocenes employed in the practice of the present invention are of general formula:

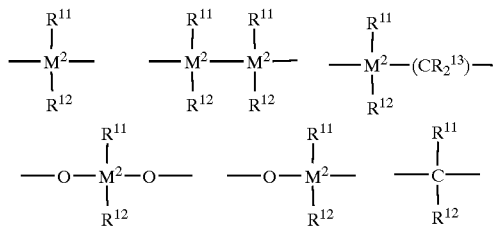

(I)

wherein:

A$^1$ and A$^2$ are independently selected from the group consisting of mononuclear and polynuclear hydrocarbons;

M$^1$ is a metal from group IVb, Vb, or VIb of the Periodic Table;

R$^1$ and R$^2$ are independently selected from the group consisting of hydrogen, C$_1$–C$_{10}$ alkyl, C$_1$–C$_{10}$ alkoxy, C$_6$–C$_{10}$ aryl, C$_6$–C$_{10}$ aryloxy, C$_2$–C$_{10}$ alkenyl, C$_7$–C$_{40}$ arylalkyl, C$_7$–C$_{40}$ alkylaryl, C$_8$–C$_{40}$ arylalkenyl and halogen;

R$^7$ is selected from the group consisting of:

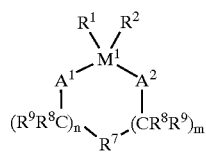

=BR$^{11}$, =AlR$^{11}$, —Ge—, —Sn—, —O—, —S—, =SO, =SO$_2$, =NR$^{11}$, =CO, =PR$^{11}$ and =P(O)R$^{11}$, where R$^{11}$, R$^{12}$, and R$^{13}$ are independently selected from the group consisting of hydrogen, halogen, C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl, or R$^{11}$ and R$^{12}$ or R$^{11}$ and R$^{13}$, in each case with the atoms connecting them, form a ring, and M$^2$ is selected from the group consisting of silicon, germanium, and tin;

R$^8$ and R$^9$ are independently selected from the group consisting of hydrogen, halogen, C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl; and m and n are identical or different and are zero, 1, or 2, with m plus n being zero, 1 or 2.

"Alkyl" is straight-chain or branched alkyl. "Halogen" (halogenated) is fluorine, chlorine, bromine, or iodine, preferably, fluorine or chlorine.

In Formula I, M$^1$ is a metal from group IVb, Vb, or VIb of the Periodic Table, for example, titanium, zirconium, hafnium, vanadium, niobium, tantalum, chromium, molybdenum, or tungsten, preferably zirconium, hafnium, or titanium.

R$^1$ and R$^2$ are identical or different and are hydrogen; C$_1$–C$_{10}$, preferably C$_1$–C$_3$ alkyl; C$_1$–C$_{10}$, preferably C$_1$–C$_3$ alkoxy; C$_6$–C$_{10}$, preferably C$_6$–C$_8$ aryl; C$_6$–C$_{10}$, preferably C$_6$–C$_8$ aryloxy; C$_2$–C$_{10}$, preferably C$_2$–C$_4$ alkenyl; C$_7$–C$_{40}$, preferably C$_7$–C$_{10}$ arylalkyl, C$_7$–C$_{40}$, preferably C$_7$–C$_{12}$ alkylaryl; C$_8$–C$_{40}$, preferably C$_8$–C$_{12}$ arylalkenyl; or halogen, preferably chlorine.

It is preferred that A$^1$ and A$^2$ be selected from the group consisting of indenyl and cyclopentadienyl. It is more preferred that A$^1$ and A$^2$ be substituted and of the structures:

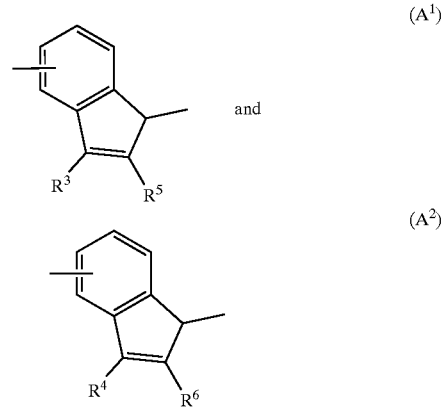

wherein:

R$^3$ and R$^4$ are identical or different and are preferably hydrogen halogen, preferably fluorine, chlorine, or bromine; C$_1$–C$_{10}$, preferably C$_1$–C$_4$ alkyl, which may be halogenated; C$_6$–C$_{10}$, preferably C$_6$–C$_8$ aryl; —N(R$^{10}$)$_2$; —SR$^{10}$; —OSi(R$^{10}$)$_3$; —Si(R$^{10}$)$_3$; or P(R$^{10}$)$_2$; wherein R$^{10}$ is halogen, preferably chlorine; C$_1$–C$_{10}$, preferably C$_1$–C$_3$ alkyl; or C$_6$–C$_{10}$, preferably C$_6$–C$_8$ aryl. It is especially preferred that R$^3$ and R$^4$ be hydrogen.

R$^5$ and R$^6$ are identical or different, preferably identical, and are as defined for R$^3$ and R$^4$. R$^5$ and R$^6$ are preferably C$_1$–C$_4$ alkyl, which may be halogenated, such as methyl, ethyl, propyl, isopropyl, butyl, isobutyl, sec-butyl, tert-butyl, or trifluoromethyl, in particular methyl.

$R^7$ is:

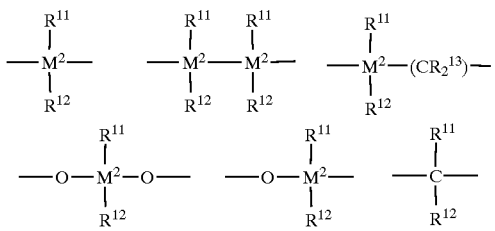

$=BR^{11}$, $=AlR^{11}$, —Ge—, —Sn—, —O—, —S—, $=SO$, $=SO_2$, $=NR^{11}$, $=CO$, $=PR^{11}$, or $=P(O)R^{11}$, wherein $R^{11}$, $R^{12}$, and $R^{13}$ are identical or different and are hydrogen; halogen; $C_1$–$C_{10}$, preferably $C_1$–$C_4$ alkyl, preferably a methyl group; $C_1$–$C_{10}$ fluoroalkyl, preferably a $CF_3$ group; $C_6$–$C_{10}$, preferably $C_6$–$C_8$ aryl; $C_6$–$C_{10}$ fluoroaryl, preferably a pentafluorophenyl group; $C_1$–$C_{10}$, preferably $C_1$–$C_4$ alkoxy, preferably a methoxy group; $C_2$–$C_{10}$, preferably $C_2$–$C_4$ alkenyl; $C_7$–$C_{40}$, preferably $C_7$–$C_{10}$ arylalkyl; $C_8$–$C_{40}$, preferably $C_8$–$C_{12}$ arylalkenyl; or $C_7$–$C_{40}$, preferably $C_7$–$C_{12}$ alkylaryl; or $R^{11}$ and $R^{12}$ or $R^{11}$ and $R^{13}$, in each case together with the atoms connecting them, form a ring.

$M^2$ is silicon, germanium, or tin, preferably silicon or germanium, more preferably silicon.

$R^7$ is preferably $=CR^{11}R^{12}$, $=SiR^{11}R^{12}$, $=GeR^{11}R^{12}$, —O—, —S—, $=SO$, $=PR^{11}$, or $=P(O)R^{11}$.

$R^8$ and $R^9$ are identical or different and are as defined as for $R^{11}$.

m and n are identical or different and are zero, 1, or 2, preferably zero or 1, where m plus n is zero, 1, or 2, preferably zero or 1.

The particularly preferred metallocenes are thus those in which, in the Formula I, $M^1$ is Zr or Hf, $R^1$ and $R^2$ are identical or different and are methyl or chlorine, $R^3$ and $R^4$ are hydrogen, $R^5$ and $R^6$ are identical or different and are hydrogen, methyl, ethyl, or to trifluoromethyl, $R^7$ is a

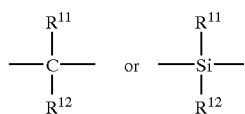

radical, and n plus m is zero or 1.

The cocatalyst, or activator, that is preferably employed with the metallocene catalysts in the practice of the present invention can be any of the aluminoxanes known to activate metallocene catalysts. For further details of the aluminoxane cocatalysts, including such alkylaluminoxanes as MAO, see, e.g., U.S. Pat. No. 5,229,478.

The preferred cocatalyst used according to the invention in the polymerization of olefins is an aluminoxane of the formula:

(II)

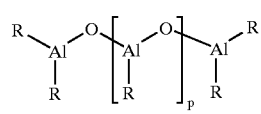

for the linear type and/or of the formula (III)

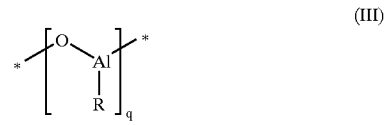

for the cyclic type, where, in the formulae (II) and (III), the radicals R may be identical or different and are $C_1$–$C_6$ alkyl, $C_6$–$C_{18}$ aryl, or hydrogen, p is an integer from 2 to 50, preferably from 10 to 35, and q is p+2.

The radicals R are preferably identical and are methyl, isobutyl, phenyl, or benzyl, preferably methyl. If the radicals R are different, they are preferably methyl and hydrogen or, alternatively, methyl and isobutyl, from 0.01 to 40% (of the number of radicals R) being hydrogen or isobutyl.

The aluminoxane can be prepared in different ways by known processes. One of the methods is, for example, the reaction of an aluminum-hydrocarbon compound and/or a hydridoaluminum-hydrocarbon compound with water (gaseous, solid, liquid, or bound—for example as water of crystallization) in an inert solvent (such as, for example, toluene). In order to prepare an aluminoxane containing different alkyl groups R, two different trialkylaluminum compounds ($AlR_3$+$AlR_3'$) in accordance with the desired composition are reacted with water (cf S. Pasynkiewicz, *Polyhedron* 9:429 (1990) and EP-A 302 424).

The precise structure of the aluminoxanes II and III is not known.

Irrespective of the preparation method, a varying content of unreacted aluminum starting compound, in free form or as an adduct, is common to all the aluminoxane solutions.

It is possible to pre-activate the metallocene of Formula I using an aluminoxane of the formula (II) and/or (III) before use in the polymerization reaction. This considerably increases the polymerization activity and improves the particle morphology.

The pre-activation of the transition-metal compound is carried out in solution. The metallocene is preferably dissolved in a solution of the aluminoxane in an inert hydrocarbon. Suitable inert hydrocarbons are aliphatic or aromatic hydrocarbons. Toluene is preferred.

The concentration of the aluminoxane in the solution is in the range from about 1% by weight up to the saturation limit, preferably from 5 to 30% by weight, in each case based on the entire solution. The metallocene can be employed in the same concentration, but is preferably employed in an amount of from $10^{-4}$ to 1 mol per mole of aluminoxane. The pre-activation time is from 5 minutes to 60 hours, preferably from 5 to 60 minutes. The pre-activation temperature is from $-78°$ C. to $100°$ C., preferably from $0°$ to $70°$ C.

The metallocene can also be prepolymerized or applied to a support. The prepolymerization is preferably carried out using the olefin or one of the olefins employed in the polymerization.

Examples of suitable supports are silica gels, aluminum oxides, solid aluminoxane, or other inorganic support materials. Another suitable support material is a polyolefin powder in finely divided form.

A further possible variation of the process comprises using a salt-like compound of the formula $R_xNH_{4-x}BR'_4$ or of the formula $R_3PHBR'_4$ as cocatalyst instead of or in addition to an aluminoxane. x here is 1, 2, or 3, the R radicals are identical or different and are alkyl or aryl, and R' is aryl, which may also be fluorinated or partially fluorinated. In this case, the catalyst comprises the product of the reaction of a metallocene with one of the compounds.

The poly(α-olefin) polymers of this invention are substantially saturated, i.e., one possessing a low iodine number, which is discussed hereinbelow, and can be obtained by polymerizing at least one α-olefin monomer, e.g., 1-decene, in the presence of a catalyst composition formed by activating a metallocene catalyst with a suitable cocatalyst. Preferably, hydrogen will also be present in the polymerization.

The α-olefins suitable for use in the preparation of the saturated poly(α-olefin) polymers described herein preferably contain from 2 to about 20 carbon atoms, more preferably from about 6 to about 16 carbon atoms. Suitable α-olefins include, but are not limited to, ethylene, propylene, 2-methylpropene, 1-butene, 3-methyl-1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and the like. Preferred α-olefins for use herein are 1-hexene, 1-octene, 1-decene, and 1-dodecene, with 1-decene being most preferred.

In accordance with the present invention, the monomers are polymerized in the presence of the meso forms of the above-described Kaminsky-type "metallocene" catalysts, which provide molecular weight and chemical control during polymerization, but do not provide high levels of crystallinity in the resulting oligomer, nor do they provide excessive levels of unsaturation in the polymer.

Some of these compounds are commercially available from sources such as Boulder Chemical, in Boulder Colo. Typically, they are formed as by-products of the commercial racemic isomer of the same compound. The racemic isomer is used in the synthesis of isotactic polypropylene, and the literature actually recommends separation of the meso isomer owing to the known formation of atactic polymer during polypropylene manufacture.

Examples of suitable catalysts include, but are not limited to, meso-$Me_2Si(2-Et-Ind)_2ZrCl_2$, meso-$Et(Ind)_2ZrCl_2$, meso-$Et(IndH_4)_2ZrCl_2$, meso-$Me_2Si(Ind)_2ZrCl_2$, meso-$Me_2Si(IndH_4)_2ZrCl_2$, meso-$Me_2Si(2-Me-Ind)_2ZrCl_2$, and meso-$Me_2Si(2-Me-4-Ph-Ind)_2ZrCl_2$. In the polymerization of α-olefins, these catalysts are commonly used in conjunction with an alkylaluminum activator, such as methylaluminoxane (MAO), and, possibly, an organoboron activator.

The use of mesomeric metallocene catalysts for the polymerization of α-olefins in the presence of hydrogen affords a completely amorphous poly(α-olefin) (PAO) with excellent clarity and substantially improved viscosity index and low temperature properties. It is especially useful that, by inclusion of hydrogen in the polymerization, the need for subsequent hydrogenation of the PAO to remove unsaturation is greatly reduced or eliminated. Additionally, minor amounts of the racemic isomer of a particular metallocene can be included without substantial detriment to the above mentioned polymer properties.

The PAO formed by this process affords an iodine number of 6 or less, preferably 4 or less, for the viscosity range of 20 to 500 cSt for material that is currently of commercially interesting "high" viscosity grade, e.g., 40 cSt at 100° C. This represents both a saving of time and a reduction in production costs from the established production of commercial PAO, which traditionally utilizes a Lewis acidic system.

In general, the metallocene catalyst can be present in the reactor in an amount, expressed in terms of its transition metal content, of from about 0.0001 to about 0.02, preferably from about 0.0002 to about 0.015 and more preferably from about 0.00025 to about 0.01, millimole/liter. Corresponding to these amounts of transition metal, the aluminoxane cocatalyst can be utilized in an amount of from about 0.01 to about 100, preferably from about 0.02 to about 75 and more preferably from about 0.025 to about 50, millimoles/liter. It will, of course, be recognized that optimum levels of metallocene catalyst and aluminoxane cocatalyst will to some extent depend upon the specific catalyst and cocatalyst selected, as well as other polymerization process variables.

When employing an aluminoxane cocatalyst, it can be advantageous to include a trialkylaluminum, such as trimethylaluminum, triethylaluminum, tri(n-propyl)aluminum, triisopropylaluminum, tri(n-butyl)aluminum, triisobutylaluminum, and the like, to reduce the amount of aluminoxane required for suitable activation of the metallocene catalyst. In general, the optional trialkylaluminum can be utilized in a molar ratio to metallocene catalyst of from about 1 to about 1000, preferably from about 2 to about 500.

It is also contemplated that a neutral or anionic metal- and/or metalloid-containing component can optionally be employed with the aluminoxane cocatalyst in activating the metallocene catalyst.

Useful neutral metal- and/or metalloid-containing components for use herein include boranes, such as perfluoroarylborane compounds, e.g., tris(pentafluorophenyl)borane, tris(methoxyphenyl)borane, tris(trifluoromethylphenyl)borane, tris(3,5-di[trifluoro-methyl]phenyl)borane, tris(tetrafluoroxylyl)borane, tris(tetrafluoro-o-tolyl)borane, and the like. Of the foregoing boranes, tris(pentafluorophenyl)borane and tris(3,5-di[trifluoromethyl]phenyl)borane are preferred. Other useful second components include aluminum homologues of the foregoing compounds.

Suitable anionic metal- and/or metalloid-containing components for use herein include borates, such as perfluoroaryl borates, e.g., lithium tetrakis(pentafluorophenyl)borate, lithium tetrakis(trifluoromethylphenyl)borate, lithium tetrakis(3,5-di{tri-fluoromethyl}phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, dimethylanilinium tetrakis(pentafluorophenyl)borate, and the like. Of the foregoing borates, dimethylanilinium tetrakis(pentafluorophenyl)borate and alkali metal borates, such as lithium tetrakis(pentafluorophenyl)borate and lithium tetrakis(3,5-di{trifluoro-methyl}phenyl)borate, are preferred. Other useful components include aluminate homologues of the foregoing compounds.

In general, the optional neutral or anionic metal- and/or metalloid-containing components can be utilized in a molar ratio to metallocene catalyst of from about 0.1 to about 10, preferably from about 0.5 to about 3.

Activation of the metallocene can be achieved by combining the aforementioned metallocene catalysts with the cocatalyst, e.g., an aluminoxane cocatalyst, either simultaneously or in any sequence and with any interval of time therebetween and either in the presence or absence of the olefin monomer and hydrogen.

It is particularly advantageous to prepare the activated metallocene catalyst composition in advance and thereafter introduce it into the polymerization reactor with the olefin monomer in the presence of hydrogen. The reaction of the metallocene catalyst with an aluminoxane cocatalyst is advantageously conducted at a temperature ranging from about 0 to about 120° C. for a time period of from about one minute to about 72 hours. Preferably, the reaction of a metallocene catalyst with an aluminoxane cocatalyst is conducted at a temperature ranging from about 10 to about 100° C. for a time period of from about fifteen minutes to about three hours, more preferably, from about 20 to about 90° C. for about thirty minutes.

Polymerization of the aforementioned monomers using hydrogen and the catalyst can be carried out in any known manner, e.g., in the liquid phase, i.e., in a solution or slurry process, or in a suspension process, either continuously or in batch. These processes are generally carried out at temperatures in the range of from about 0° C. to about 200° C., preferably from about 50° C. to about 150° C., and pressures from about 10 to about 3000 psig. As one skilled in the art would readily appreciate, control of the polymerization temperature has a direct bearing on the quality of the polymerization, e.g., activity, as well as the final product properties, e.g., iodine number. However, as these temperatures approach 150° C. or greater, the exothermic temperature, i.e., the maximum temperature reached during the polymerization, should be substantially close to the initial polymerization temperature, e.g., at temperatures above about 150° C. the exothermic temperature should be no more than about 20° C. greater than the initial polymerization temperature.

The polymerization can be carried out in liquid monomer and in the absence of solvent or, if desired, in the presence of solvent. Dilution solvents that can be employed include straight and branched chain hydrocarbons, such as the butanes, the pentanes, the hexanes, the heptanes, the octanes, and the like, cyclic and alicyclic hydrocarbons, such as cyclopentane, cyclohexane, cycloheptane, methylcyclopentane, methylcyclohexane, methylcycloheptane, and the like, and alkyl-substituted aromatic compounds, such as toluene, xylene, and the like, and mixtures of the foregoing.

A typical batch solution polymerization process can be carried out by first introducing the α-olefin, e.g., 1-decene, either alone or in combination with an optional hydrocarbon solvent, e.g., hexanes, xylenes, etc., into a stirred tank reactor. A minor amount of an inert impurity scavenger, e.g., the aforementioned trialkylaluminum compounds, can also be added at this time. The reactor is then brought up to the desired temperature, e.g., from about 0 to about 200° C., preferably from about 20 to about 175° C., and a measured amount of hydrogen can then be introduced into the stirred tank reactor. If polymerization is desired with a gaseous monomer, a monomer feed comprising, for example, ethylene or 1-propene, is then sparged into the liquid phase, either in combination with, or separate from, the hydrogen feed. By carrying out the polymerization reaction in the presence of hydrogen and employing the catalyst herein, a hydrogenation step can be eliminated and the liquid poly(α-olefins) of this invention will be substantially saturated and, therefore, will possess a low iodine value, e.g., an iodine number of from about 0.0 to about 10, preferably from about 0.1 to about 6, and most preferably from about 0.2 to about 4.

Once the desired conditions are established, a hydrocarbon solution of the catalyst in the required amount is then added to the liquid phase in the reactor. The rate of polymerization is controlled by the concentration of the catalyst and monomers present or added during polymerization. The reactor temperature is controlled by means of cooling coils, etc., and the initial total pressure in the reactor is maintained by a constant flow of hydrogen, inert gas, gaseous monomers, or a combination thereof. After polymerization is complete, the reactor is depressurized and the catalyst is deactivated by conventional means.

Depending on the amount of monomer conversion and viscosity of the reactor contents, a hydrocarbon solvent can be added to aid in removal the product polyolefin. Spent catalyst components can be isolated from the reaction product via mixing with, e.g., alcohol, water, or a mixture of both, then by phase separation of the hydrocarbyl component from the aqueous component. The liquid polyolefin can then be recovered from the hydrocarbyl component by conventional methods, e.g., evaporation, distillation, etc., and then further processed as desired.

The poly(α-olefin) polymers that can be obtained by the polymerization process herein are substantially amorphous, i.e., a crystalline phase is substantially absent from the resulting polyolefin as defined by an exothermic peak observation in a differential scanning calorimetry (DSC) experiment. In addition to being substantially amorphous, the poly(α-olefin) polymers that can be obtained by the polymerization process herein possess a unique combination of low weight average molecular weight ($M_w$), low polydispersity index ($M_w/M_n$, where $M_n$ is number average molecular weight), controllable kinematic viscosity ($Kv_{100}$), high viscosity index (VI), low iodine number ($I_2$#), i.e., a substantially saturated polyolefin, and low glass transition temperature ($T_g$). The poly(α-olefin) polymers possess a $M_w$ of from about 500 to about 50,000, preferably from about 1,000 to about 30,000, and more preferably from about 1,500 to about 20,000, a $M_w/M_n$ of from about 1.0 to about 10, preferably from about 1.5 to about 5, more preferably from about 1.75 to about 3, a $Kv_{100}$ of from about 10 to about 10,000, preferably from about 15 to about 1,000; more preferably from about 20 to about 500, an iodine number of from about 0.0 to about 10, preferably from about 0.001 to about 6, more preferably from about 0.002 to about 4, and a $T_g$ of below about 50° C., preferably below about 65° C., more preferably below about −70° C.

These advantageous properties can be exploited in a variety of products, such as, for example, products which require a viscous oil or an inert material with fluid properties such as dispersants, heat transfer fluids, fuels, cosmetics, or other such consumer products, and the like. Additionally, the products of this invention can be used in grafting applications to produce functionalized low molecular weight polymers. The poly(α-olefin) polymers of this invention are particularly useful as viscosity modifiers for lubricants, especially lubricating oils, wherein the polymer is employed in a viscosity-modifying amount. Concentrations of from about 1 to about 99 weight percent based on the total weight of the lubricant composition can be used. Preferably, the concentration is from about 5 to about 85 weight percent.

In general, mineral oils, both paraffinic, naphthenic and mixtures thereof, including those oils defined as American Petroleum Institute Groups I, II, and III can be employed as the lubricant vehicle, and can be any suitable lubricating viscosity range, as, for example, from about 2 cSt at 100° C. to about 1,000 cSt at 100° C., preferably from about 2 to about 100 cSt at 100° C. These oils can have viscosity indices preferably ranging to about 180. The average molecular weights of these oils can range from about 250 to about 800.

Where synthetic oils are employed, they can include, but are not limited to, polyisobutylene, polybutenes, hydrogenated polydecenes, polypropylene glycol, polyethylene glycol, trimethylpropane esters, neopentyl and pentaerythritol esters, di(2-ethylhexyl)sebacate, di(2-ethylhexyl) adipate, dibutyl phthalate, fluorocarbons, silicate esters, silanes, esters of phosphorus-containing acids, liquid ureas, ferrocene derivatives, hydrogenated synthetic oils, chain-type polyphenyls, siloxanes and silicones (polysiloxanes), alkyl-substituted diphenyl ethers typified by a butyl-substituted bis(p-phenoxy phenyl)ether, and phenoxy phenyl ethers.

The lubricant compositions can also contain one or more other materials, for example, detergents, corrosion inhibitors, oxidative inhibitors, dispersants, pour point dispersants, anti-foaming agents, anti-wear agents, other viscosity modifiers, friction modifiers, and the like at the usual levels in accordance with well known practice. Other materials, including extreme pressure agents, low temperature properties modifiers, and the like, can also be used, as exemplified, respectively, by metallic phenates or sulfonates, polymeric succinimides, non-metallic or metallic phosphorodithioates, and the like, at the usual levels in accordance with well known practice. These materials do not detract from the value of the compositions of this invention, but rather serve to impart their customary properties to the particular compositions in which they are incorporated.

The advantages and the important features of the present invention will be more apparent from the following examples.

EXAMPLES

In the following examples, all catalysts used were obtained from commercial sources and used as received without additional purification. meso-dimethylsilyl bis(2-methyl-1-indenyl)zirconium dichloride, i.e., meso-Me$_2$Si(2-MeInd)$_2$ZrCl$_2$, meso-dimethylsilyl bis(1-indenyl)zirconium dichloride, meso-Me$_2$Si(Ind)$_2$ZrCl$_2$, meso-ethylene bis(1-indenyl)zirconium dichloride, i.e., meso-Et(Ind)$_2$ZrCl$_2$, meso-ethylene bis(tetrahydroindenyl)zirconium dichloride, i.e., meso-Et(IndH$_4$)$_2$ZrCl$_2$, was obtained from Boulder Scientific Company of Mead, Colo. or from Crompton Corp. of Bergkamen, Germany as a solid material of 80% or better purity, the major impurity being the racemic isomer. meso-dimethylsilyl bis(2-methyl-4-phenyl-1-indenyl)zirconium dichloride, meso-Me$_2$Si(2-Me-4-Ph-Ind)$_2$ZrCl$_2$, was obtained from Süd-Chemie Catalytica of Mountain View, Calif. racemic-dimethylsilyl bis(2-methyl-1-indenyl) zirconium dichloride, i.e., rac-Me$_2$Si(2-MeInd)$_2$ZrCl$_2$ was obtained from Boulder Scientific Company of Mead, Colo. or from Crompton Corp. of Bergkamen, Germany as a solid material of 98% or better purity, the major impurity being the meso isomer. Methyl aluminoxane (MAO), 10 wt. % Al in toluene, and triisobutylaluminum (TIBAl), 25 weight % Al in hexanes, were used as received from Crompton Corp. of Bergkamen, Germany. Hexane solvent and α-olefin monomers (1-hexene, 1-octene, 1-decene, 1-dodecene, 1-hexadecene) were purified over 3 Å molecular sieves and activated silica/alumina. Anhydrous grade toluene solvent was used as received from Aldrich Chemical Co. of Milwaukee, Wis., and stored over dry, deoxygenated nitrogen or argon.

Unless otherwise indicated, all polymerizations were performed in a jacketed 3-liter Büchi autoclave reactor equipped with a magnetically coupled agitator, a thermocouple, and various inlets. The autoclave was flushed with nitrogen or argon and anhydrous hexane prior to use, then charged with the monomer(s) and, optionally, with an inert diluent. TIBAl was optionally used as an impurity scavenger. The reactor was brought up to the desired pressure and temperature and then the catalyst components were added, whereupon polymerization was started. Reactor pressure was both obtained and maintained by addition of argon, nitrogen and/or hydrogen. The run temperature was maintained at the predetermined setpoint via automated control.

Upon completion of the polymerization experiment, the reactor was depressurized and the reactor temperature controller was set to 20° C. Periodically, hexane was used to help facilitate removal of higher viscosity products from the reactor into a wash vessel. The reactor contents were then pressure transferred to a vessel equipped with an agitator containing 50 mL of acidified isopropanol in 400 mL of water and agitated for 2 minutes. The mixture was allowed to settle, and then the organic layer was removed from the aluminum residue-laden aqueous layer. The remaining organic solution was then filtered to remove any particulate matter and residual monomer and volatiles were removed by evaporation under reduced pressure in a rotary evaporator.

Kinematic Viscosity (Kv) and Viscosity Index (VI)

The kinematic viscosity (Kv) of the liquid polyolefins was measured using a modified Ostwald viscometer according to ASTM standard D445 and reported at temperatures of 100° C. (Kv at 100° C.) or 40° C. (Kv at 40° C.).

The viscosity index (VI) was measured according to ASTM standard D2270 using the measured kinematic viscosities for each polyolefin.

Weight Average Molecular Weight ($M_w$) and Number Average Molecular Weight ($M_n$)

The molecular weights of the liquid polyolefins, $M_w$ and $M_n$, were measured in tetrahydrofuran at 35° C. on a Waters GPC II gel permeation chromatograph equipped with a Waters RA401 refractive index detector and 5 Waters Styragel HT columns (HT6, HT5, HT4, HT3, and HT2). The flow rate was 1 mL/min. and the concentration was 0.25%. Molecular weights were calculated from elution times calibrated against polystyrene standards from American Polymer Standards Corp. (ranging from 162 molecular weight to 600,000 molecular weight) using a quadratic fit.

Differential Scanning Calorimetry

Differential scanning calorimetry was used to record the glass transition temperature (Tg), and melt or crystalline transitions exhibited by the liquid polyolefin samples. The experiment was performed on a Perkin-Elmer DSC 7 differential scanning calorimeter by rapid cooling of 20–25 mg of polymer without molding, then heating the sample from −100° C. to 180° C. at a heating rate of 20° C./minute). $T_g$ is reported as the midpoint of the glass transition on the heating curve of the sample. A crystalline transition, Tc, is reported as the peak of any exothermic event (if any) during heating, and a melt transition, Tm, is reported as the peak of any endothermic event (if any) during heating. Calibration was performed with both indium and octane standards.

Unsaturation Determination by Iodine Number

The amount of unsaturation in the liquid polyolefins was determined by measurement of the iodine number, which is defined as the number of grams of iodine that add to 100 grams of sample. Only halogen that combines with a sample by way of addition to double bonds is a true measurement of unsaturation. Substitution reactions and, to a lesser extent, splitting-out reactions contribute to some error in the determination. In this method, mercuric acetate catalyzed the slow rate of addition of iodine to double bonds, allowing the reaction to be completed in about one hour, whereby the effects of the slower substitution and splitting-out reactions were minimized. The method was adapted from Gallo et al., "Unsaturation in Isoprene-Isobutylene Copolymers", *Industrial and Engineering Chemistry*, 40:1277–1280 (1948).

Polymer Analysis by NMR Spectroscopy

NMR spectroscopy was performed on a Varian Mercury-300. $^1$H and $^{13}$C NMR spectra were acquired at room temperature. For $^1$H spectra, the relaxation time was 1.00 s, and acquisition time was 2.67 s. The total number of scans was 96. For $^{13}$C spectra, relaxation time was 1.63 s, and acquisition time was 0.87 s. The total number of scans was 2048. Samples (15 mg for $^1$H and 200 mg for $^{13}$C) were dissolved in 0.6 mL CDCl$_3$ in a glass vial at room temperature with sufficient stirring to ensure homogeneity. The solution was transferred into a 5-mm NMR tube for spectrum acquisition. Determinations performed from these data included proton and carbon chemical shift assignments for all major peaks found and detection of relative unsaturation in polymer.

Example 1

A dried 3-liter Büchi reactor was filled under argon with 1,250 mL of dry 1-decene. The reactor temperature was brought up to 90° C. with agitation and then sufficient hydrogen was added to bring the reactor pressure to 200 psig. A solution of 0.012 gram of meso-dimethylsilyl bis(2-methyl-1-indenyl)zirconium dichloride, i.e., meso-Me$_2$Si(2-MeInd)$_2$ZrCl$_2$, dissolved in 15 mL of toluene and 4.4 mL of a 10 wt % solution of MAO in toluene that had been prepared 30 minutes prior to use was injected into the stirred reactor with a slight overpressure of argon. The reactor was maintained at a pressure of 200 psig via addition of hydrogen on demand and a temperature of 90° C. was maintained for a period of 30 minutes. Upon completion and work-up of the reaction, 740.4 grams of a clear, colorless liquid polyolefin material was obtained for a catalyst efficiency of 61.70 Kg/g. Kinematic viscosity measurements at 100° C. and 40° C. showed values of 39.4 and 312 cSt, respectively. The viscosity index was calculated at 179. Unsaturation, as measured by Iodine Number, was 2.2. GPC analysis revealed a M$_w$ of 3,160, a M$_n$ of 1,699 and a polydispersity (M$_w$/M$_n$) of 1.90. DSC analysis of the polymer confirmed the amorphous nature of the polymer, indicating no crystallinity events and a T$_g$ of −75.7° C. $^1$H and $^{13}$C NMR analysis performed on this material indicated that there was little to no detectable unsaturation in the polymer. Comparison of the integration of the unsaturated versus the saturated regions in $^1$H NMR showed that less than 0.06% of the hydrogen present in the sample was unsaturated.

Example 2

A dried 3-liter Büchi reactor was filled under argon with 1,500 mL of dry 1-decene. The reactor temperature was brought up to 100° C. with agitation and then sufficient hydrogen was added to bring the reactor pressure to 100 psig. A solution of 0.012 gram meso-dimethylsilyl bis(2-methyl-1-indenyl)zirconium dichloride, i.e., meso-Me$_2$Si(2-MeInd)$_2$ZrCl$_2$, dissolved in 21 mL of toluene and 8.8 mL of a 10 wt % solution of MAO in toluene that had been prepared 30 minutes prior to use was injected into the stirred reactor with a slight overpressure of argon. The reactor was maintained at a pressure of 100 psig via addition of hydrogen on demand, and a temperature of 100° C. was maintained for a period of 30 minutes.

Upon completion and work-up of the reaction, 934.2 grams of a clear, colorless liquid polyolefin material was obtained, for a catalyst efficiency of 77.85 Kg/g. Kinematic viscosity measurements at 100° C. and 40° C. showed values of 93.9 and 780 cSt, respectively. The viscosity index was calculated at 213. Unsaturation, as measured by iodine number, was 4.5. GPC analysis revealed a M$_w$ of 5,615, a M$_n$ of 2,692, and a polydispersity (M$_w$/M$_n$) of 2.1. DSC analysis of the polymer confirmed the amorphous nature of the polymer, indicating no melting or crystallinity events and a T$_g$ of −73.4° C.

Comparative Examples A, B, and C

Two commercial samples of high viscosity, hydrogenated poly(1-decene) known as Synton® PAO-40 and PAO-100, available from Crompton Corporation of Middlebury, Conn., and a commercial sample available from ExxonMobil Corp. of Paulsboro, N.J., were obtained and compared against the materials synthesized in Examples 1 and 2.

For PAO-40 (Comparative Example A), kinematic viscosity measurements at 100° C. and 40° C. showed values of 40.1 and 399 cSt, respectively, and a viscosity index of 150.5. Unsaturation, as measured by iodine number, was 6.6.

For PAO-100 (Comparative Example B), kinematic viscosity measurements at 100° C. and 40° C. showed values of 99.6 and 1254.7 cSt, respectively, and a viscosity index of 168. Unsaturation, as measured by iodine number, was 2.2.

The commercial sample of high viscosity poly(1-decene) from ExxonMobil Corp. (Comparative Example C) had kinematic viscosity measurements at 100° C. and 40° C. showed values of 38.9 and 394.6 cSt, respectively, and a viscosity index of 150.5. Unsaturation, as measured by iodine number, was 2.2.

Thus, at comparable viscosities, the materials of Examples 1 and 2 exhibit an increase in viscosity index and equivalent or lowered unsaturation without the aid of a secondary hydrogenation step, which is commonly employed in the manufacture of the commercial materials shown in Comparative Examples A, B, and C, and known in the art.

Comparative Example D

A dried 3-liter Büchi reactor was filled under argon with 1,250 mL of dry 1-decene. The reactor temperature was brought up to 100° C. with agitation and then sufficient hydrogen was added to bring the reactor pressure to 200 psig. A solution of 0.020 gram of racemic-dimethylsilyl bis(2-methyl-1-indenyl)zirconium dichloride, i.e., rac-Me$_2$Si(2-MeInd)$_2$ZrCl$_2$, dissolved in 35 mL of toluene and 14.4 mL of a 10 wt % solution of MAO in toluene that had been prepared 30 minutes prior to use was injected into the stirred reactor with a slight overpressure of argon. The reactor was maintained at a pressure of 200 psig via addition of hydrogen on demand and a temperature of 100° C. was maintained for a period of 30 minutes.

Upon completion and work-up of the reaction, 522.2 grams of a clear, colorless liquid polyolefin material was obtained for a catalyst efficiency of 26.11 Kg/g. Kinematic viscosity measurements at 100° C. and 40° C. showed values of 116 and 1,039 cSt, respectively. The viscosity index was calculated at 214. Unsaturation, as measured by iodine number, was 2.8. GPC analysis revealed a M$_w$ of 7,084, a M$_n$ of 2,906, and a polydispersity (M$_w$/M$_n$) of 2.4. DSC analysis of the polymer exhibited a T$_g$ of −72.4° C. and, additionally, a crystalline transition peak of −38.9° C. and two melt transition peaks at 6.0 and 19.7° C. The presence of melt and crystalline transitions in this polymer sample is evidence that this material is not totally amorphous above its glass transition temperature and, thus, would not be suitable for lubricant applications.

Examples 3–6

Temperature Study

The procedure of Example 1 was repeated for this series, except that the polymerization temperature was varied to look at a representative range of operating temperatures, all other conditions being identical. This range is by no means meant to limit the scope or practice of the present invention. Following polymerization and work-up of the reactor contents, samples were analyzed for yield, viscosity, and iodine number. The results are shown in Table 1.

TABLE 1

| Example | Polymerization Temperature, (° C.) | Efficiency Kg/g | $Kv_{100}$ | Iodine Number | $M_w$ | $M_w/M_n$ | $T_g$ (° C.) |
|---|---|---|---|---|---|---|---|
| 3 | 45 | 20.31 | 80.8 | 0.9 | 5,782 | 2.70 | −75.2 |
| 4 | 60 | 37.60 | 64.4 | 1.4 | 4,456 | 2.20 | −73.6 |
| 5 | 75 | 47.62 | 50.8 | 2.2 | 3,581 | 1.90 | −74.6 |
| 1 | 90 | 61.70 | 39.4 | 2.2 | 3,160 | 1.90 | −75.8 |
| 6 | 110 | 56.24 | 32.0 | 3.5 | 2,761 | 1.9 | −76.8 |

Examples 7–12

$H_2$ Study

The procedure of Example 1 was repeated for this series, except that the total pressure of hydrogen in the reactor was varied to investigate the effects of a representative range of hydrogen concentrations and reactor operating pressures, all other conditions being identical. These conditions should by no means limit the scope or practice of the invention. Following polymerization and work-up of the reactor contents, samples were analyzed for yield, viscosity, and iodine number. The results are shown in Table 2.

TABLE 2

| Example | $H_2$ pressure, psig | Efficiency, Kg/g | $Kv_{100}$ | Iodine Number | $M_w$ | $M_w/M_n$ | $T_g$ (° C.) |
|---|---|---|---|---|---|---|---|
| 7 | 0 | 16.4 | 1,227 | 4.9 | 29,929 | 1.9 | −66.8 |
| 8 | 25 | 30.30 | 453 | 3.2 | 16,182 | 2.0 | −67.7 |
| 9 | 50 | 76.91 | 333 | 3.6 | 12,376 | 2.2 | −68.5 |
| 10 | 75 | 75.97 | 167 | 3.4 | 7,777 | 2.0 | −70.3 |
| 11 | 90 | 75.03 | 130 | 2.8 | 7,844 | 2.0 | −73.0 |
| 12 | 100 | 77.85 | 93.9 | 4.5 | 5,615 | 2.1 | −73.5 |
| 1 | 125 | 71.28 | 80.1 | 3.0 | 4,988 | 1.9 | −73.3 |
| 2 | 200 | 61.70 | 39.4 | 2.2 | 3,160 | 1.90 | −75.8 |

Examples 13–15

Rac/Meso Study

A dried 3-liter Büchi reactor was filled under argon with 1,250 mL of dry 1-decene. The reactor temperature was brought up to 90° C. with agitation, and then sufficient hydrogen was added to bring the reactor pressure to 200 psig. A catalyst mixture was prepared containing a 0.010 gram total of the catalyst of Comparative Example D, rac-Me$_2$Si(2-MeInd)$_2$ZrCl$_2$, and the catalyst of Example 1, meso-Me$_2$Si(2-MeInd)$_2$ZrCl$_2$, in the weight porportions described below in Table 3. The mixture was dissolved in 15 mL of toluene, combined with 3.6 mL of a 10 wt % solution of MAO in toluene 30 minutes prior to polymerization, then injected into the stirred reactor with a slight overpressure of argon. The reactor was maintained at a pressure of 200 psig via addition of hydrogen on demand and a temperature of 90° C. was maintained for a period of 30 minutes.

Upon completion and work-up of the reaction, a clear, colorless liquid polyolefin material was obtained. Polymerization efficiencies and polymer properties are summarized in Table 3 below and are compared against the properties for Example 1 and Comparative Example C, which represent 100% meso- and 100% rac-isomers of the catalyst.

TABLE 3

| Example | Rac/Meso Ratio | Efficiency, Kg/g | Kv100 | Iodine Number | Mw | Mw/Mn | Tg (E C) | Tc | Tm |
|---|---|---|---|---|---|---|---|---|---|
| 1 | 0% | 61.7 | 39.4 | 2.2 | 3,160 | 1.90 | −75.8 | N.D.* | N.D. |
| 13 | 25% | 65.48 | 61.0 | 3.3 | 4,576 | 2.1 | −75.9 | −52.3 | 2.0, 18.7 |
| 14 | 50% | 52.38 | 82.1 | 3.0 | 5,388 | 2.1 | −74.1 | −27.9 | 4.0, 19.7 |
| 15 | 75% | 27.13 | 107 | 2.4 | 6,337 | 2.2 | −73.1 | −27.9 | 4.4, 20.4 |
| C | 100% | 26.11 | 116 | 2.8 | 7,084 | 2.4 | −72.4 | −38.9 | 6.1, 19.7 |

*N.D. means None Detected.

Example 16

A dried 3-liter Büchi reactor was filled under argon with 1,250 mL of dry 1-decene. The reactor temperature was brought up to 80° C. with agitation and then sufficient hydrogen was added to bring the reactor pressure to 100 psig. A solution of 0.036 gram meso-ethylene bis(1-indenyl) zirconium dichloride, i.e., meso-Et(Ind)$_2$ZrCl$_2$, dissolved in 66 mL of toluene and 30 mL of a 10 wt % solution of MAO in toluene that had been prepared 30 minutes prior to use was injected into the stirred reactor with a slight overpressure of argon. The reactor was maintained at a pressure of 100 psig via addition of hydrogen on demand and a temperature of 80° C. was maintained for a period of 30 minutes.

Upon completion and work-up of the reaction, 533.8 grams of a clear, colorless liquid polyolefin material was obtained, for a catalyst efficiency of 14.83 Kg/g. Kinematic viscosity measurements at 100° C. and 40° C. showed values of 58.4 and 670 cSt, respectively. The viscosity index was calculated at 152. Unsaturation as measured by iodine number was 2.1.

Example 17

A dried 3-liter Büchi reactor was filled under argon with 1,250 mL of dry 1-decene. The reactor temperature was brought up to 80° C. with agitation and then sufficient hydrogen was added to bring the reactor pressure to 100 psig. A solution of 0.048 gram of meso-ethylene bis (tetrahydroindenyl)zirconium dichloride, i.e., meso-Et (IndH$_4$)$_2$ZrCl$_2$, dissolved in 88 mL of toluene and 49 mL of a 10 wt % solution of MAO in toluene that had been prepared 30 minutes prior to use was injected into the stirred reactor with a slight overpressure of argon. The reactor was maintained at a pressure of 100 psig via addition of hydrogen on demand, and a temperature of 80° C. was maintained for a period of 30 minutes.

Upon completion and work-up of the reaction, 9.85 grams of a clear, colorless liquid polyolefin material was obtained, for a catalyst efficiency of 0.205 Kg/g. Kinematic viscosity measurements at 100° C. and 40° C. showed values of 10.8 and 51 cSt, respectively. The viscosity index was calculated at 211. Unsaturation as measured by iodine number was 2.9.

Example 18

A dried 3-liter Büchi reactor was filled under argon with 1,250 mL of dry 1-decene. The reactor temperature was brought up to 80° C. with agitation, and then sufficient hydrogen was added to bring the reactor pressure to 100 psig. A solution of 0.024 gram of meso-dimethylsilyl bis(1-indenyl)zirconium dichloride, meso-Me$_2$Si(Ind)$_2$ZrCl$_2$, dissolved in 24 mL of toluene and 18.4 mL of a 10 wt % solution of MAO in toluene which had been prepared 30 minutes prior to use was injected into the stirred reactor with a slight overpressure of argon. The reactor was maintained at a pressure of 200 psig via addition of hydrogen on demand, and a temperature of 90° C. was maintained for a period of 30 minutes.

Upon completion and work-up of the reaction, 627 grams of a clear, colorless liquid polyolefin material was obtained, for a catalyst efficiency of 26.125 Kg/g. Kinematic viscosity measurements at 100° C. and 40° C. showed values of 112.2 and 1,036 cSt, respectively. The viscosity index was calculated at 208. Unsaturation as measured by Iodine Number was 3.2.

Example 19

A dried 3-liter Büchi reactor was filled under argon with 1,500 mL of dry 1-decene. The reactor temperature was brought up to 80° C. with agitation, and then sufficient hydrogen was added to bring the reactor pressure to 100 psig. A solution of 0.012 gram of meso-dimethylsilyl bis(2-methyl-4-phenyl-1-indenyl)zirconium dichloride, meso-Me$_2$Si(2-Me-4-Ph-Ind)$_2$ZrCl$_2$, dissolved in 18 mL of toluene and 3.3 mL of a 10 wt % solution of MAO in toluene that had been prepared 30 minutes prior to use was injected into the stirred reactor with a slight overpressure of argon. The reactor was maintained at a pressure of 200 psig via addition of hydrogen on demand, and a temperature of 90° C. was maintained for a period of 30 minutes.

Upon completion and work-up of the reaction, 370.9 grams of a clear, colorless liquid polyolefin material was obtained, for a catalyst efficiency of 30.9 Kg/g. Kinematic viscosity measurements at 100° C. and 40° C. showed values of 24.8 and 166 cSt, respectively. The viscosity index was calculated at 183. Unsaturation as measured by iodine number was 0.4.

Comparative Example E

A dried 3-liter Büchi reactor was filled under argon with 1,250 mL of dry 1-decene. The reactor temperature was brought up to 80° C. with agitation and then sufficient hydrogen was added to bring the reactor pressure to 100 psig. A solution of 0.024 gram of an unbridged metallocene, bis(indenyl)zirconium dichloride, i.e., (Ind)$_2$ZrCl$_2$, dissolved in 45 mL of toluene and 21 mL of a 10 wt % solution of MAO in toluene that had been prepared 30 minutes prior to use was injected into the stirred reactor with a slight overpressure of argon. The reactor was maintained at a pressure of 200 psig via addition of hydrogen on demand and a temperature of 45° C. was maintained for a period of 30 minutes.

Upon completion and work-up of the reaction, 133.9 grams of a clear, colorless liquid polyolefin material was obtained, for a catalyst efficiency of 5.58 Kg/g. Kinematic viscosity measurements at 100° C. and 40° C. showed values of 4.2 and 15.5 cSt, respectively. The viscosity index was calculated at 195. Unsaturation as measured by iodine number was 3.1. Thus, although this catalyst produced a poly (1-decene) with a suitably low unsaturation value when polymerized in the presence of hydrogen, the conditions employed did not yield a significant quantity of polymer, nor did the viscosity of the polymer reach a high viscosity range of >20 cSt at 100° C.

Comparative Examples F–I

A dried 3-liter Büchi reactor was filled under Ar with 750 mL of dry 1-decene. To this, 1.15 mL of a 25% by wt. solution of triisobutyl aluminum, TIBAl, in hexane was added to scavenge moisture and impurities, and the reactor temperature was increased to the desired temperature. Once at the desired temperature, hydrogen gas was added to the reactor via pressure drop from a vessel of known volume to the desired molar quantity, listed in Table 4 below. Then solutions of various bridged and unbridged metallocene catalysts were dissolved in 10 wt. % solutions of MAO in toluene at a 1000:1 molar MAO:Zr ratio, which had been prepared 30 minutes prior to its use, and injected into the stirred reactors under 200 psig argon pressure. The reactor was maintained at the desired temperature and at a pressure of 200 psig for 30 minutes.

When complete, the reactors were depressurized and 400 mL of hexane was added to each of the polymerized decene solutions to aid in transfer. Then the contents of each reactor was each pressure-transferred to a vessel equipped with an agitator containing 100 mL of acidified isopropanol and agitated for 2 minutes. White flocculent materials, presumed to be aluminum alkoxides, precipitated and settled in the aqueous phase. One liter of deionized water was then added to each washed mixture, stirred, allowed to settle, and the organic layers were removed from the aluminum residue-laden aqueous layers.

The polymers were obtained from the remaining organic solutions by evaporation under reduced pressure in a rotary evaporator. The results are summarized below in Table 4.

TABLE 4

| Example | Catalyst M | Grams M | H$_2$ (mol) | Temp. (° C.) | Activity Kg/g cat | Kv (at 100° C.) | Kv (at 40° C.) | VI | Iodine Number |
|---|---|---|---|---|---|---|---|---|---|
| F | Cp$_2$ZrCl$_2$,* | 0.030 | 0.0 | 40 | 5.39 | 41.4 | 295 | 196 | 26 |
| G | Cp$_2$ZrCl$_2$ | 0.013 | 1.0 | 86 | 15.12 | 2.56 | 7.81 | 181 | 157 |
| H | (nBuCp)$_2$ZrCl$_2$ | 0.009 | 1.0 | 89 | 21.97 | 2.34 | 7.12 | 163 | 133 |
| I | Me$_2$Si(Cp)$_2$ZrCl$_2$ | 0.018 | 1.0 | 40 | 4.28 | 12 | 69 | 175 | 49.1 |

*Cp is cyclopentadienyl.

As these data show, employing a catalyst outside the scope of this invention provides a polyolefin possessing significantly high iodine numbers, and when hydrogen is used, both the polymerization yield and the viscosity obtained make it unsuitable for the application intended as a viscosity modifier.

In view of the many changes and modifications that can be made without departing from principles underlying the invention, reference should be made to the appended claims for an understanding of the scope of the protection to be afforded the invention.

What is claimed is:

1. A process for the preparation of a poly(α-olefin) polymer comprising polymerizing at least one α-olefin in the presence of hydrogen and a catalytically effective amount of catalyst to form a substantially amorphous polymer possessing a $M_w$ of from about 500 to about 50,000, a $M_w/M_n$ of from about 1.0 to about 10, a $Kv_{100}$ of from about 10 to about 10,000, an iodine number of from about 0.0 to about 10, and a $T_g$ of below about −60° C., wherein the catalyst comprises the product obtained by combining a metallocene catalyst with a cocatalyst, the metallocene catalyst being at least one meso compound of general formula:

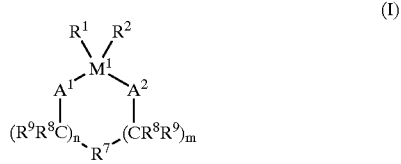

(I)

wherein:
- A$^1$ and A$^2$ are independently selected from the group consisting of mononuclear and polynuclear hydrocarbons;
- M$^1$ is a metal from group IVb, Vb, or VIb of the Periodic Table;
- R$^1$ and R$^2$ are independently selected from the group consisting of hydrogen, C$_1$–C$_{10}$ alkyl, C$_1$–C$_{10}$ alkoxy, C$_6$–C$_{10}$ aryl, C$_6$–C$_{10}$ aryloxy, C$_2$–C$_{10}$ alkenyl, C$_7$–C$_{40}$ arylalkyl, C$_7$–C$_{40}$ alkylaryl, C$_8$–C$_{40}$ arylalkenyl and halogen;
- R$^7$ is selected from the group consisting of:

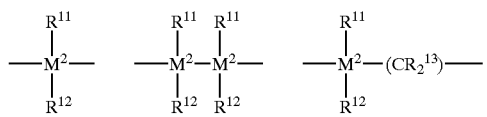

-continued

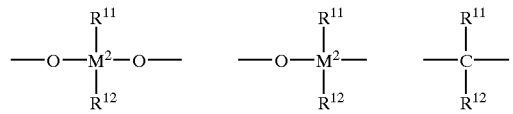

=BR$^{11}$, =AlR$^{11}$, —Ge—, —Sn—, —O—, —S—, =SO, =SO$_2$, =NR$^{11}$, =CO, =PR$^{11}$ and =P(0)R$^{11}$, where R$^{11}$, R$^{12}$, and R$^{13}$ are independently selected from the group consisting of hydrogen, halogen, —C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl, or, alternatively, R$^{11}$ can be combined with R$^{12}$ or R$^{11}$ can be combined with R$^{13}$, in each case with the atoms connecting them, to form a ring; and M$^2$ is selected from the group consisting of silicon, germanium, and tin;

R$^8$ and R$^9$ are independently selected from the group consisting of hydrogen, halogen, C$_1$–C$_{10}$ alkyl, C$_1$–C$_{10}$ fluoroalkyl, C$_6$–C$_{10}$ aryl, C$_6$–C$_{10}$ fluoroaryl, C$_1$–C$_{10}$ alkoxy, C$_2$–C$_{10}$ alkenyl, C$_7$–C$_{40}$ arylalkyl, C$_8$–C$_{40}$ arylalkenyl, and C$_7$–C$_{40}$ alkylaryl;

m and n are identical or different and are zero, 1, or 2, with m plus n being zero, 1 or 2.

2. The process of claim 1 wherein the metallocene catalyst based in terms of the transition metal M$^1$, is present in an amount from 0.0001 to about 0.02 millimole/liter and the cocatalyst is present in an amount from 0.01 to about 100 millimoles/liter.

3. The process of claim 1 wherein the α-olefin contains from 2 to about 20 carbon atoms.

4. The process of claim 1 wherein the cocatalyst is an aluminoxane.

5. The process of claim 1 wherein the α-olefin is 1-decene.

6. The process of claim 4 wherein the metallocene catalyst is combined with the aluminoxane cocatalyst and hydrogen in any order thereof and in the presence or absence of α-olefin.

7. The process of claim 1 wherein the catalyst is selected from the group consisting of meso-Me$_2$Si(2-Et-Ind)$_2$ZrCl$_2$, meso-Et(Ind)$_2$ZrCl$_2$, meso-Et(IndH$_4$)$_2$ZrCl$_2$ meso-Me$_2$Si (Ind)$_2$ZrCl$_2$, meso-Me$_2$Si(IndH$_4$)$_2$ZrCl$_2$ meso-Me$_2$Si(2-Me-Ind)$_2$ZrCl$_2$, and meso-Me$_2$Si(2-Me-4-Ph-Ind)$_2$ZrCl$_2$.

* * * * *